United States Patent
Okada (10) Patent No.: US 10,634,828 B2
(45) Date of Patent: Apr. 28, 2020

(54) DIAPHRAGM APPARATUS, LENS APPARATUS, AND IMAGING APPARATUS

(71) Applicant: CANON KABUSHIKI KAISHA, Tokyo (JP)

(72) Inventor: Tadanori Okada, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/170,532

(22) Filed: Oct. 25, 2018

(65) Prior Publication Data

US 2019/0146125 A1 May 16, 2019

(30) Foreign Application Priority Data

Nov. 13, 2017 (JP) ................... 2017-218602

(51) Int. Cl.
*G03B 9/06* (2006.01)
*G02B 5/00* (2006.01)

(52) U.S. Cl.
CPC ............... *G02B 5/005* (2013.01); *G03B 9/06* (2013.01)

(58) Field of Classification Search
CPC .................................. G03B 9/06; G03B 9/10
USPC ........................................................ 396/510
See application file for complete search history.

(56) References Cited

FOREIGN PATENT DOCUMENTS

| JP | 2008134283 A | 6/2008 |
| JP | 2014071144 A | 4/2014 |
| JP | 2017120347 A | * 7/2017 |

OTHER PUBLICATIONS

Translation of JP Publication No. 2017-120347; Title: Light-Amount Adjustment Device; Publication Date: Jul. 6, 2017. (Year: 2017).*

* cited by examiner

*Primary Examiner* — Clayton E. LaBalle
*Assistant Examiner* — Fang-Chi Chang
(74) *Attorney, Agent, or Firm* — Rossi, Kimms & McDowell LLP

(57) ABSTRACT

According to an aspect of the invention, the diaphragm apparatus includes: a plurality of diaphragm blades which define an aperture diameter; a driving member which includes a protrusion protruding in an optical axis direction, rotates around an optical axis, and drives the diaphragm blades to change the aperture diameter; and a base plate which includes a rail part with which the protrusion contacts to be movable in a direction of a rotation of the driving member. The plurality of diaphragm blades are disposed in a gap between the driving member and the base plate, the gap being defined when the protrusion and the rail part contact with each other. A size of the gap changes in accordance with the rotation of the driving member in the optical axis direction.

9 Claims, 9 Drawing Sheets

FIG. 11

DIAPHRAGM APPARATUS, LENS APPARATUS, AND IMAGING APPARATUS

BACKGROUND OF THE INVENTION

Field of the Invention

The present invention relates to a diaphragm apparatus, a lens apparatus, and an imaging apparatus.

Description of the Related Art

A lens barrel used for a camera includes a diaphragm apparatus which adjusts an amount of incident light. A diaphragm apparatus in the related art includes a rotating member which rotates about an optical axis, a base plate which rotatably holds the rotating member, and a plurality of diaphragm blades disposed between the rotating member and the base plate. An amount of light is adjusted by driving the plurality of diaphragm blades by the rotation of the rotating member.

When a plurality of diaphragm blades are in a small aperture state, the diaphragm blades overlap and blade distal ends warp in an optical axis direction. When the diaphragm blades warp, for example, a blade distal end comes into contact with a rotating member and a driving torque of the rotating member can increase. On the other hand, when a plurality of diaphragm blades are in an open aperture state, a desired aperture accuracy may not be able to be obtained when the diaphragm blades rattle in the optical axis direction.

A diaphragm apparatus described in Japanese Patent Laid-Open No. 2014-71144 prevents an increase in driving torque by widening a gap between a base plate and a rotating member in a small aperture state and the rattling of diaphragm blades by narrowing the gap in an open aperture state.

However, in the diaphragm apparatus described in Japanese Patent Laid-Open No. 2014-71144, a size of the apparatus is likely to increase in an optical axis direction to secure the gap between the base plate and the rotating member in the small aperture state. Furthermore, the driving torque is likely to increase due to the narrowed gap and the overlapping diaphragm blades in the open aperture state.

SUMMARY OF THE INVENTION

The present invention proposes a diaphragm apparatus which is advantageous in view of driving efficiency of diaphragm blades and a lens apparatus and an imaging apparatus using the diaphragm apparatus.

According to an aspect of the invention, a diaphragm apparatus comprises: a plurality of diaphragm blades which define an aperture diameter; a driving member which includes a protrusion protruding in an optical axis direction, rotates around an optical axis, and drives the diaphragm blades to change the aperture diameter; and a base plate which includes a rail part with which the protrusion contacts to be movable in a direction of a rotation of the driving member, wherein the plurality of diaphragm blades are disposed in a gap between the driving member and the base plate, the gap being defined when the protrusion and the rail part contact with each other, a size of the gap changes in accordance with the rotation of the driving member in the optical axis direction, and the size of the gap in the optical axis direction when the aperture diameter is a first aperture diameter is greater than the size of the gap in the optical axis direction when the aperture diameter is a second aperture diameter smaller than the first aperture diameter.

Further features of the present invention will become apparent from the following description of exemplary embodiments with reference to the attached drawings.

DESCRIPTION OF THE EMBODIMENTS

Embodiments of the present invention will be described below with reference to the drawings and the like. Note that the same members and constituent elements will be denoted with the same reference numerals in the drawings and overlapping description thereof will be omitted.

First Embodiment

Figure 1:
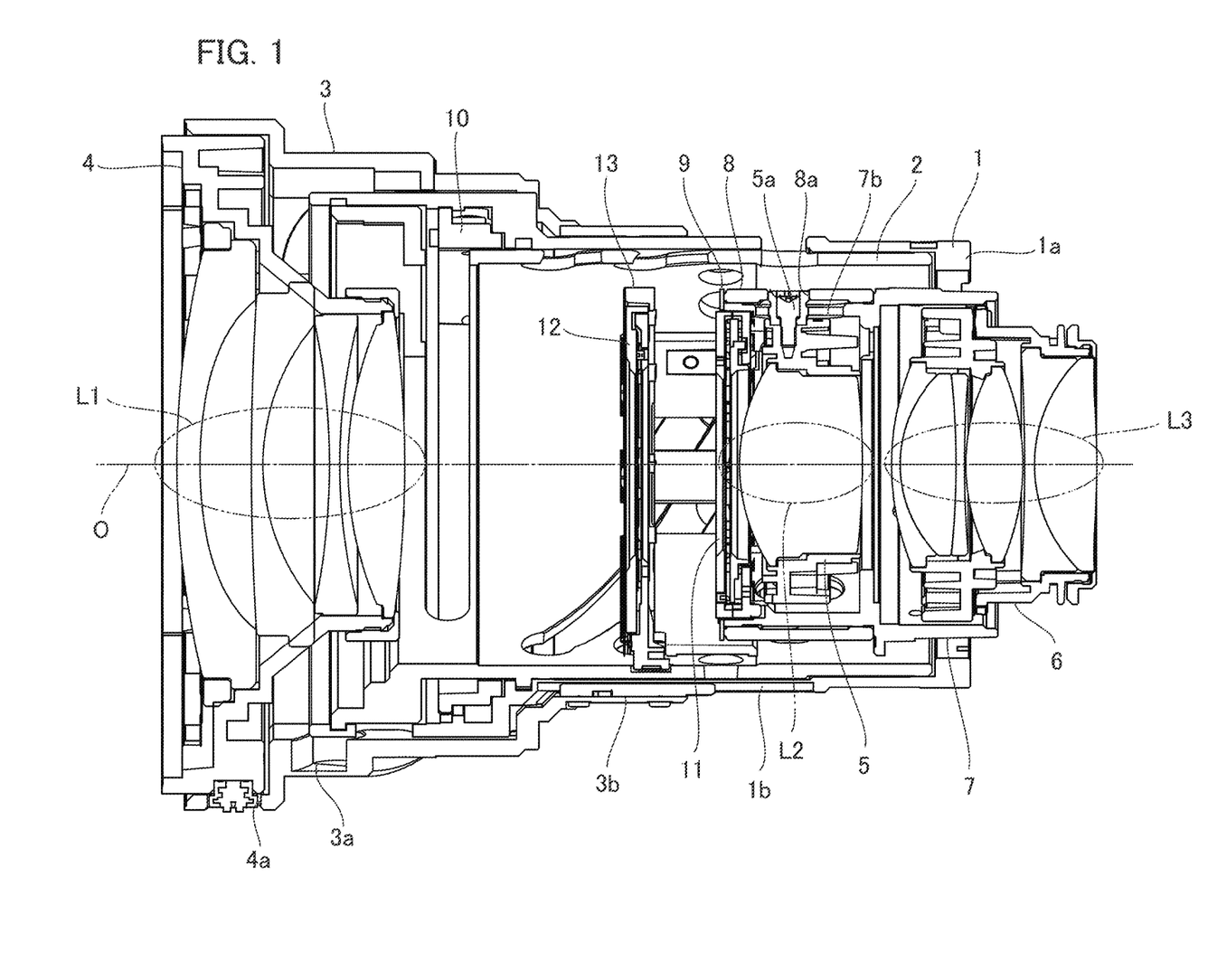
FIG. 1 is a cross-sectional view of a lens apparatus (wide angle state) including a diaphragm apparatus according to a first embodiment.
Figure 2:
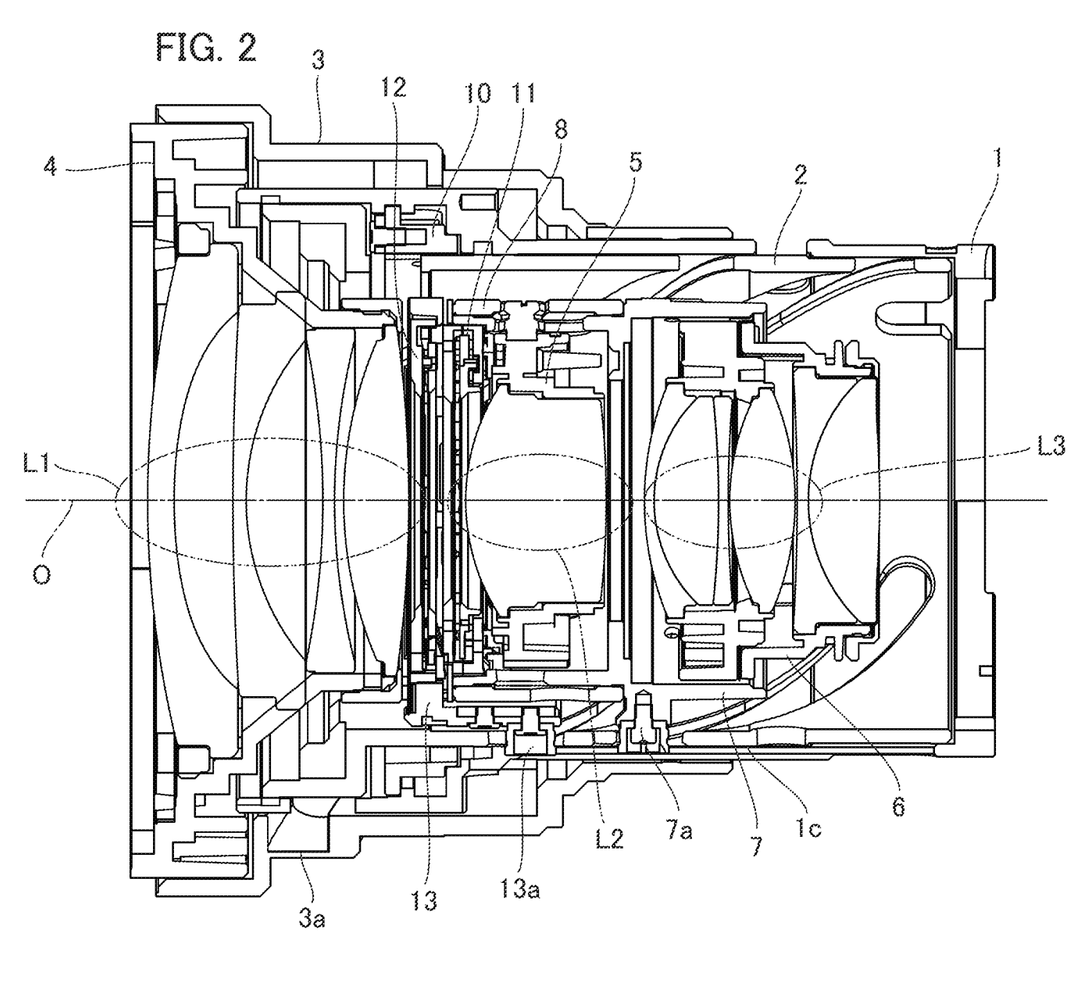
FIG. 2 is a cross-sectional view of a lens apparatus (telephoto state) including the diaphragm apparatus according to the first embodiment.

FIGS. 1 and 2 are cross-sectional views of a lens apparatus including a diaphragm apparatus according to a first embodiment. FIG. 1 illustrates a lens apparatus 100 having a wide angle state and FIG. 2 illustrates the lens apparatus 100 having a telephoto state. It should be noted that, in FIGS. 1 and 2, a first lens group L1 side is a subject side and a third lens group L3 side is an imaging plane side, which will be described later.

A mount member (not shown) configured to be joined to a camera main body and an external member are fixed to a rear end 1*a* of a fixed cylinder 1. A cam ring 2 performs zooming. The cam ring 2 has an inner circumference formed to be fitted to the fixed cylinder 1 and is rotatably held by the fixed cylinder 1. A first barrel group 4 is fixed to an end portion of a rectilinear cylinder 3 on a subject side by a roller 4*a*. The first lens group L1 is fixed to the first barrel group 4.

The rectilinear cylinder 3 is movably fitted to an outer circumference of the fixed cylinder 1. In addition, the rectilinear cylinder 3 includes three key members 3b in a circumferential direction thereof. When the key members 3b are engaged with rectilinear grooves 1b provided in the outer circumference of the fixed cylinder 1, the rectilinear cylinder 3 is held in the fixed cylinder 1 to be movable in a straight line in an optical axial O direction.

Figure 3:
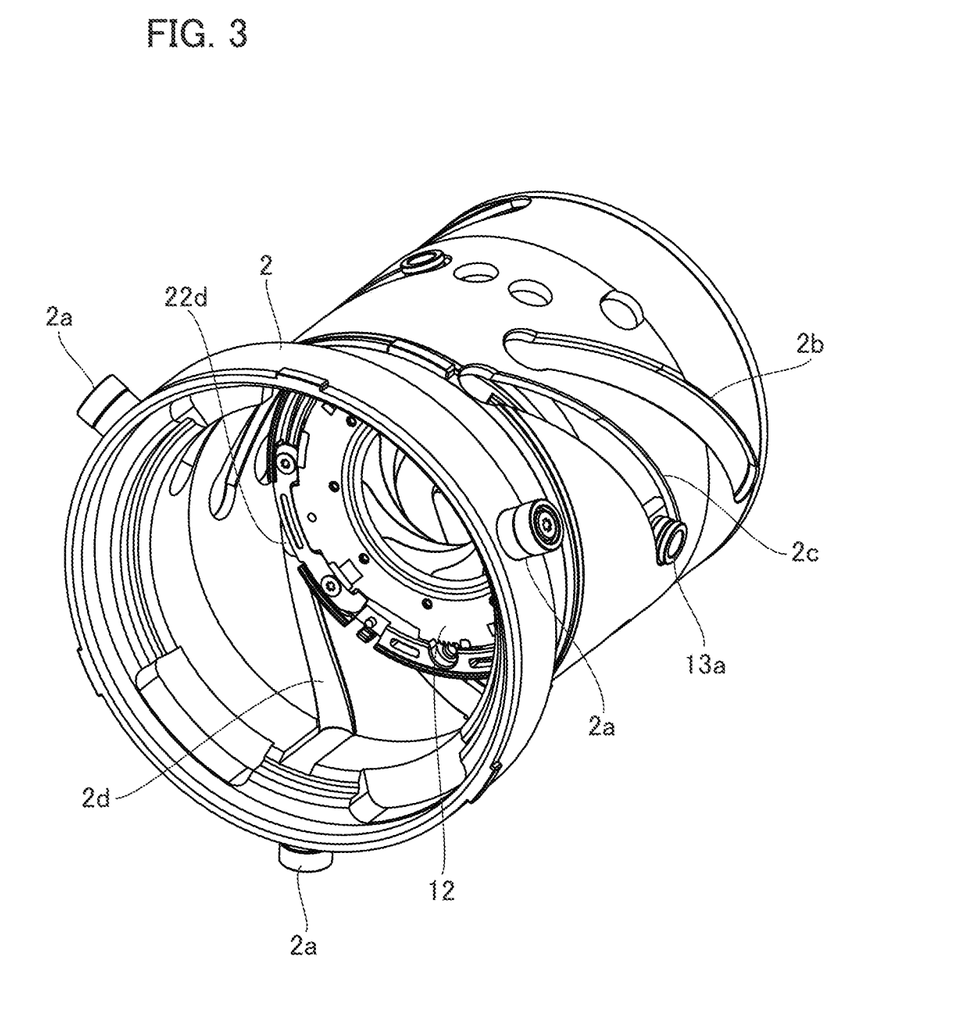
FIG. 3 is a perspective view showing a relationship between a sub-diaphragm unit and a cam ring according to the first embodiment.

The rectilinear cylinder 3 includes a bottomed first cam group 3a formed on an inner circumference thereof. A roller 2a which is provided on a subject side end outer circumference of the cam ring 2 and illustrated in FIG. 3 is engaged with the first cam group 3a. Thus, the rectilinear cylinder 3 linearly moves along the trajectory of the first cam group 3a due to the rotation of the cam ring 2.

Referring again to FIGS. 1 and 2, a second barrel group 5 holds a second lens group L2. A third barrel group 6 holds a third lens group L3. A third base frame group 7 holds the third barrel group 6 by a plurality of rollers. The plurality of rollers are fixed to the third base frame group 7 so that the eccentricity and tilting of the third barrel group may be adjusted.

Three rollers 7a are held on an outer circumference of the third base frame group 7 with equal intervals therebetween. The rollers 7a are engaged with the rectilinear grooves 1b in the fixed cylinder 1 and a third cam group 2b in the cam ring 2. Therefore, when the cam ring 2 rotates, the third barrel group 6 linearly moves in the optical axial O direction integrally with the third base frame group 7.

A focus cam ring 8 is rotatably fitted to the outer circumference of the third base frame group 7. The focus cam ring 8 is held to be rotatable in a fixed position with respect to the third base frame group 7 by a pressing plate 9 screw-fixed to a front end of the third base frame group 7.

Three focus cam grooves 8a are provided in the focus cam ring 8 with equal intervals therebetween and three rollers 5a provided in the second barrel group 5 are engaged with the focus cam ring 8. The rollers 5a are also engaged with rectilinear grooves 7b provided in the third base frame group 7.

The second barrel group 5 is linearly driven in the optical axial O direction by the rotation of the focus cam ring 8. Focus adjustment is performed when the second barrel group 5 independently moves in the optical axial O direction.

A rotating ring 10 is rotatably held on an inner circumference of the fixed cylinder 1. The rotating ring 10 has a focus key (not shown) attached thereto. The focus key transmits a rotational force to the focus cam ring 8. The focus key has a structure in which the rotating ring 10 and the focus cam ring 8 rotate by the same angle regardless of a zoom position. A driving force of a focus motor or a manual focus ring (which are not shown) is transmitted to a surface of an outer circumference side of the rotating ring 10 and thus focus adjustment can be performed. An electromagnetic diaphragm unit 11 based on a known technique is electrically connected to a driving circuit (not shown).

A sub-diaphragm unit 12 is a diaphragm apparatus according to the embodiment and is attached to a sub-diaphragm barrel 13. FIG. 3 is a perspective view showing a relationship between the sub-diaphragm unit 12 and the cam ring 2. A roller 13a is attached to the sub-diaphragm barrel 13 (which is illustrated in FIGS. 1 and 2). The roller 13a is engaged with a rectilinear groove 1c in the fixed cylinder 1 and a movable diaphragm cam 2c in the cam ring 2 illustrated in FIG. 3. Therefore, the sub-diaphragm barrel 13 linearly moves in the optical axial O direction when the cam ring 2 is rotated.

Figure 4:
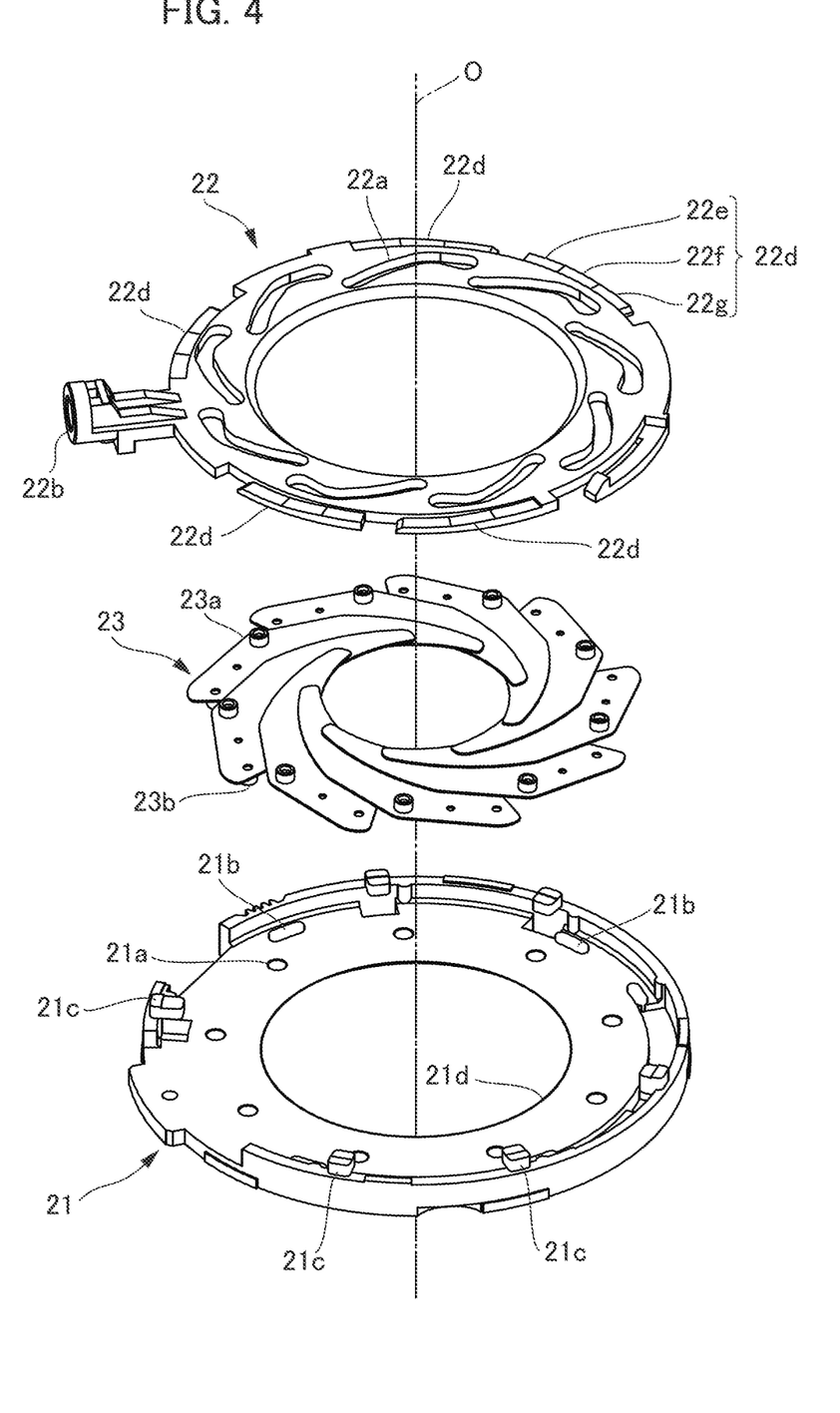
FIG. 4 is an exploded perspective view of the sub-diaphragm unit according to the first embodiment.

A structure of the diaphragm apparatus according to the first embodiment will be described below. FIG. 4 is an exploded perspective view of the sub-diaphragm unit 12 according to the first embodiment. The sub-diaphragm unit 12 includes a base plate 21, a driving ring 22, and diaphragm blades 23.

The driving ring 22 is rotatably held so that an outer circumference thereof is fitted inside the base plate 21. The number of cam grooves 22a in the driving ring 22 corresponds to the number of diaphragm blades and the cam grooves 22a are engaged with bosses 23a in the diaphragm blades 23. A cam follower 22b is provided in the driving ring 22.

In addition, the driving ring 22 includes a rail part 22d configured to change a gap between the driving ring 22 and the base plate 21. A plurality of rail parts 22d may be provided. The rail part 22d includes, for example, a plurality of surfaces such as an open side plane part 22e, an inclined surface part 22f, and a small diaphragm side plane part 22g.

The diaphragm blades 23 also have bosses 23b on back surfaces serving as surfaces on which the bosses 23a are provided and are rotatably fitted into holes 21a of the base plate 21. The base plate 21 includes a pressing part 21c fitted to the driving ring 22. The pressing part 21c has a protrusion which protrudes in the optical axial O direction and comes into contact with the rail part 22d.

Figure 5:
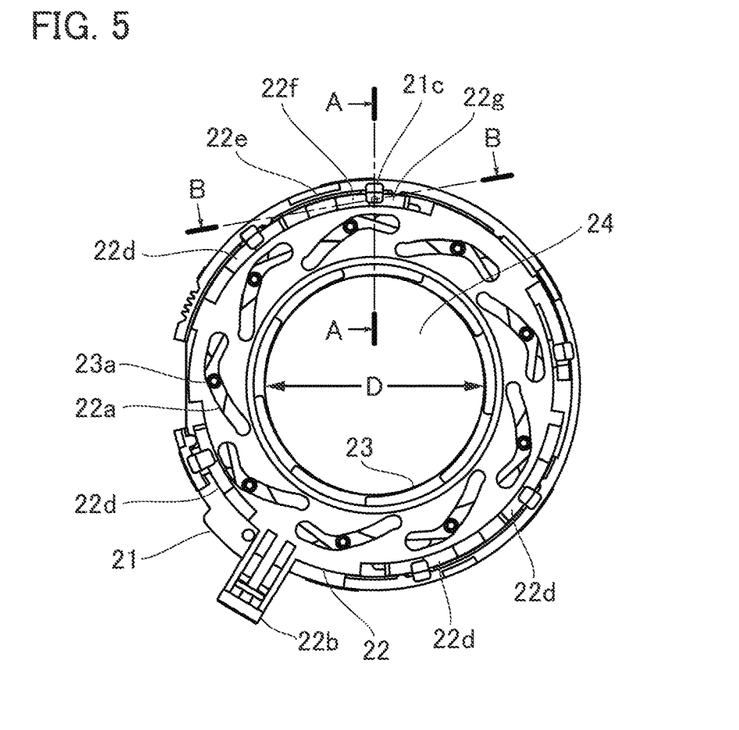
FIG. 5 is a plan view of the sub-diaphragm unit (open aperture state) according to the first embodiment viewed from a rotating ring side.
Figure 6:
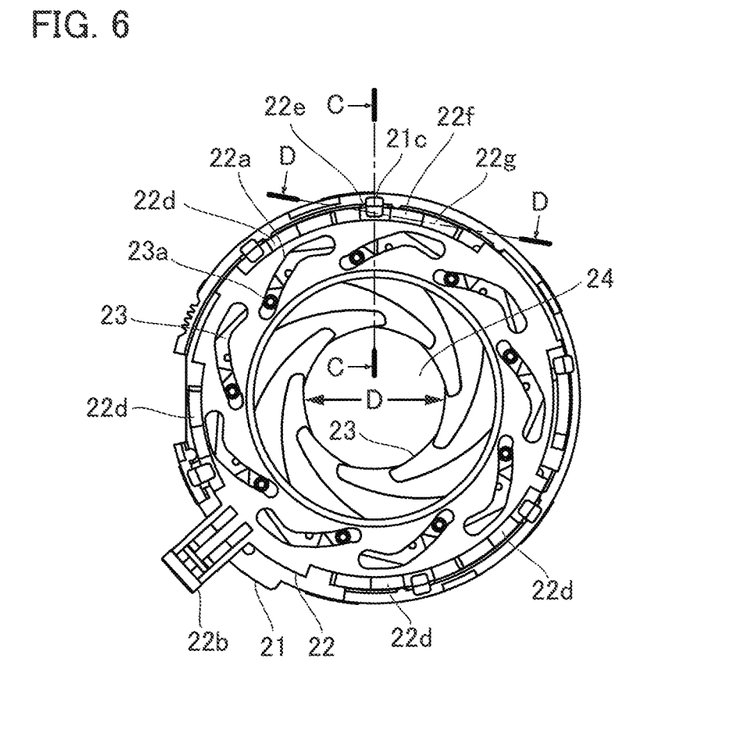
FIG. 6 is a plan view of a sub-diaphragm unit (small aperture state) according to the first embodiment viewed from the rotating ring side.

FIGS. 5 and 6 are plan views of the sub-diaphragm unit 12 according to the first embodiment viewed from the driving ring 22 side. FIG. 5 illustrates the sub-diaphragm unit (open aperture state) and FIG. 6 illustrates sub-diaphragm unit (small aperture state). A configuration in which, when the driving ring 22 is rotated around an optical axial O, the diaphragm blades 23 rotate about the bosses 23b so that an aperture diameter D of a lens aperture 24 formed (defined) by the plurality of diaphragm blades changes is provided. In other words, the driving ring 22 is a driving member.

As illustrated in FIG. 3, the cam follower 22b provided on the driving ring 22 is engaged with a sub-diaphragm driving cam 2d provided in an inner circumference of the cam ring 2. Thus, when the cam ring 2 is rotated, the sub-diaphragm barrel 13 linearly moves in the optical axial O direction and at the same time the driving ring 22 is rotated. At that time, the aperture diameter D changes in accordance with the diaphragm blades 23. The sub-diaphragm unit 12 has the role of changing an aperture in accordance with a focal length so that a maximum aperture of f does not change due to zooming.

Figure 7A:
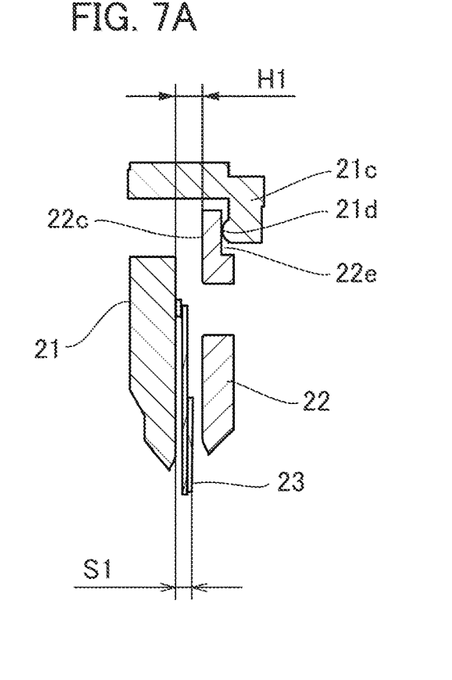
FIGS. 7A, 7B, 7C, and 7D are cross-sectional views of the sub-diaphragm unit according to the first embodiment.
Figure 7B:
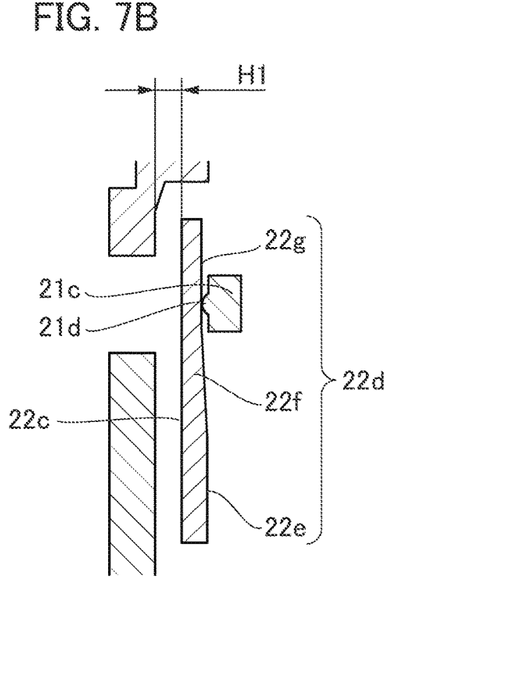
Figure 7C:
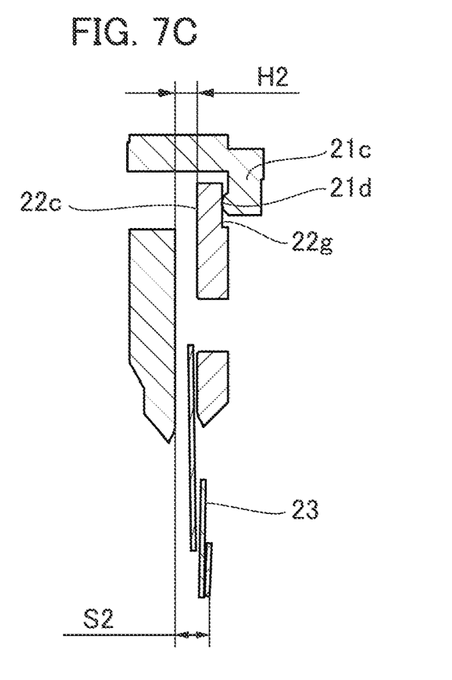
Figure 7D:
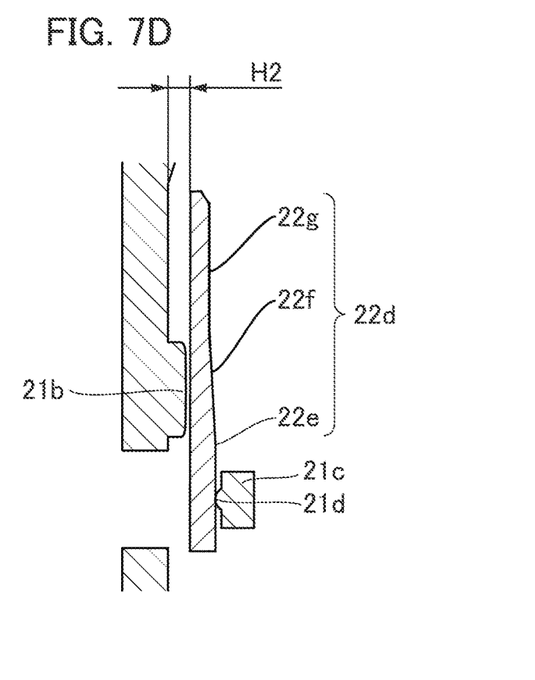

The rail part 22d in the driving ring 22 will be described. FIGS. 7A, 7B, 7C, and 7D are cross-sectional views of the sub-diaphragm unit 12 according to the first embodiment. FIG. 7A is a cross-sectional view taken along line A-A in FIG. 5. FIG. 7B is a cross-sectional view taken along line B-B in FIG. 5. FIG. 7C is a cross-sectional view taken along line C-C in FIG. 6. FIG. 7D is a cross-sectional view taken along line D-D in FIG. 6.

A position of the driving ring 22 in the optical axial O direction is restricted when a protrusion part 21b provided on the base plate 21 comes into contact with a plane part 22c of the rotating ring. At that time, a minimum gap is secured for a gap between the driving ring 22 and the base plate 21 in the optical axial O direction in which the diaphragm blades 23 can move (are disposed) (hereinafter referred to as a "blade space"). In other words, the protrusion part 21b comes into contact with the plane part 22c in the rotating ring when the blade space is minimized.

The positional restriction on a side in which the blade space widens to have a maximum value is performed when a protrusion 21d protruding in the optical axial O direction of the pressing part 21c provided on the base plate 21 comes into contact with the open side plane part 22e of the rail part 22d provided on the driving ring 22.

The blade space changes when the rail part 22d and the protrusion 21d come into contact with each other. A plurality of surfaces included in the rail part 22d come into contact with the protrusion 21d at different positions in the optical axial O direction. The plurality of surfaces are provided to correspond to a size of the aperture diameter D. A configuration is provided such that the protrusion 21d comes into contact with the open side plane part 22e at the time of opening, comes into contact with the small diaphragm side plane part 22g at the time of a small diaphragm, and comes into contact with the inclined surface part 22f at an intermediate diaphragm. When the driving ring 22 is rotated, the protrusion 21d moves while coming into contact with the rail part 22d in a rotational direction of the driving ring 22. The driving ring 22 can move in the optical axial O direction without tilting and it is possible to change the blade space.

With the above configuration, as illustrated in FIGS. 7A to 7D, a blade space H1 at the time of opening (when the aperture diameter D is large or when the aperture diameter D is a first aperture diameter) is wider than a blade space H2 at the time of a small diaphragm (when the aperture diameter D is small or when the aperture diameter D is a second aperture diameter smaller than the first aperture diameter). In addition, as the aperture diameter D is increased, the blade space becomes wider.

Figure 8:
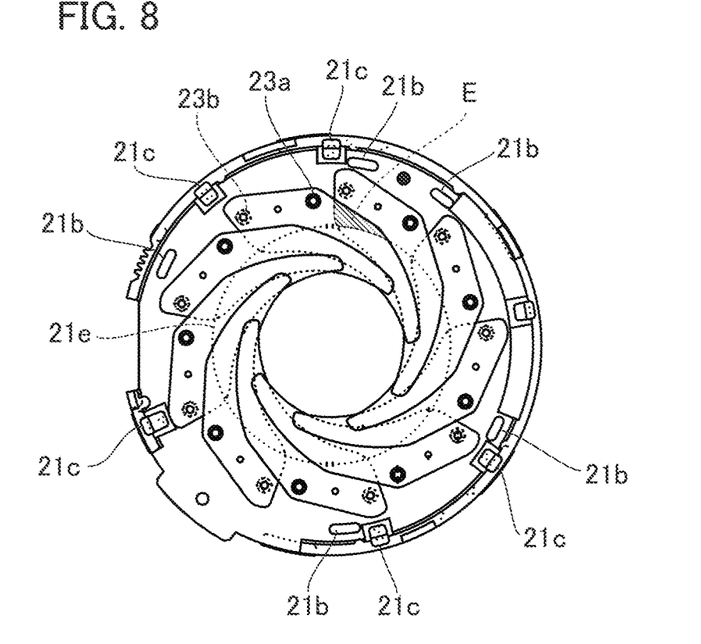
FIG. 8 is a plan view showing a state in which a driving ring of the sub-diaphragm unit (small aperture state) according to the first embodiment is removed.
Figure 9:
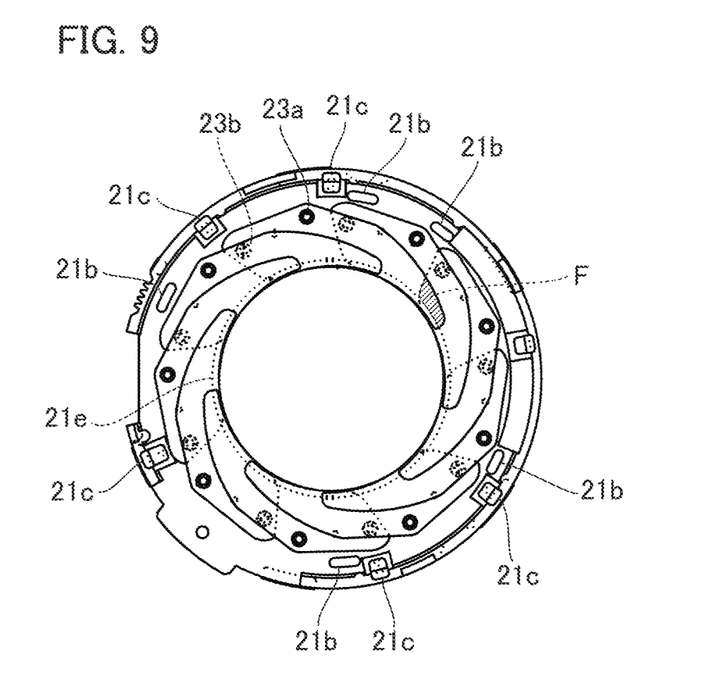
FIG. 9 is a plan view showing a state in which the driving ring of the sub-diaphragm unit (open aperture state) according to the first embodiment is removed.

FIGS. 8 and 9 are plan views showing states in which the driving ring 22 of the sub-diaphragm unit 12 according to the first embodiment is removed. FIG. 8 illustrates the sub-diaphragm unit (small aperture state) and FIG. 9 illustrates the sub-diaphragm unit (open aperture state). The hidden lines are indicated by dotted lines such that overlapping of the blades can be seen.

It can be seen that the maximum number of overlapping diaphragm blades 23 is two in a portion sandwiched by the base plate 21 and the driving ring 22 (a portion further outward than a base plate inner diameter 21e) in the small aperture state in FIG. 8. For example, in a range E, two diaphragm blades 23 overlap. On the other hand, it can be seen that the maximum number of overlapping diaphragm blades 23 is three in the portion sandwiched by the base plate 21 and the driving ring 22 (a portion further outward than the base plate inner diameter 21e) in the open aperture state in FIG. 9. For example, in a range F, three diaphragm blades 23 overlap.

Since the number of overlapping diaphragm blades 23 increases in the open aperture state, the driving ring 22 is pressed against the protrusion 21d of the base plate due to a thickness of the blades 23 unless the blade space increases correspondingly and thus the movement of the rotating ring deteriorates in some cases.

Normally, design is performed to secure a blade space larger than the total thickness of the diaphragm blades when the diaphragm blades maximally overlap. However, since the diaphragm blades overlap in inclined states, it is necessary to provide a blade space larger than the sum of the simple thicknesses. Furthermore, also when the flatness of the diaphragm blades deteriorates, similarly, the movement of the rotating ring deteriorates in some cases. Therefore, it is necessary to secure sufficient blade space by taking into account such cases.

On the other hand, since the number of overlapping blades is reduced in the small aperture state, the working load of the driving ring 22 does not increase. However, when the aperture diameter is reduced, it is easy for warpage to be generated due to the overlapping of the blades. When an amount of warpage at the time of opening as illustrated in FIG. 7A is assumed to be S1 and an amount of warpage at the time of a small diaphragm as illustrated in FIG. 7C is assumed to be S2, S2 tends to be larger than S1.

In order to prevent such warpage, a blade space may be reduced. In the embodiment, warpage is prevented by reducing the blade space in the small aperture state and an increase in operation torque of the rotating ring is minimized by widening the blade space in the open aperture state.

Second Embodiment

Figure 10A:
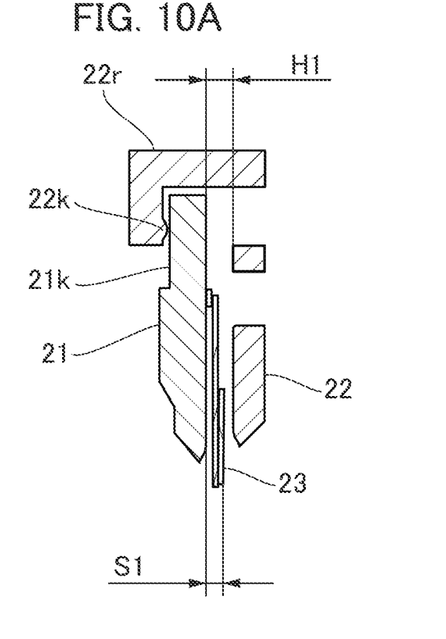
FIGS. 10A, 10B, 10C, and 10D are cross-sectional views of a sub-diaphragm unit according to a second embodiment.
Figure 10B:
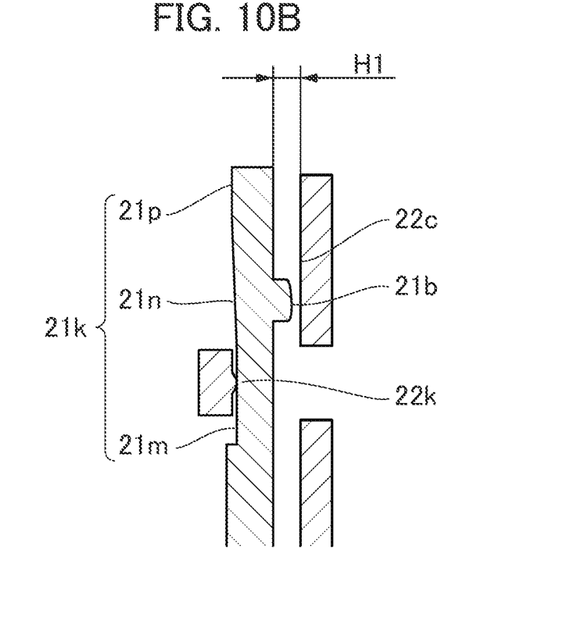
Figure 10C:
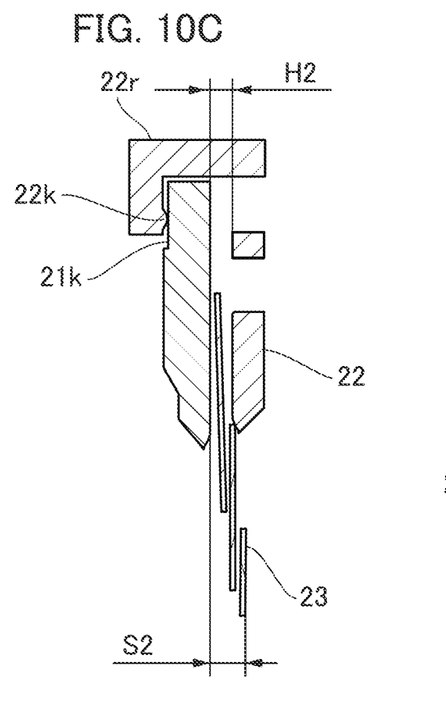
Figure 10D:
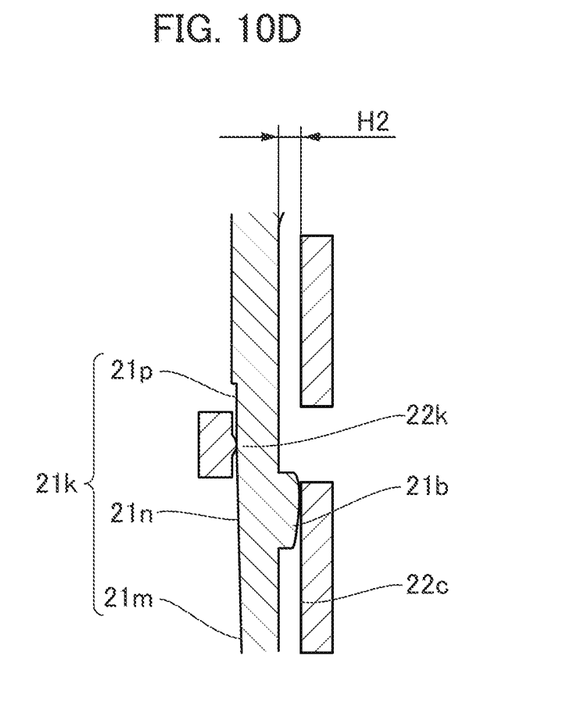

FIGS. 10A, 10B, 10C, and 10D are cross-sectional views of a sub-diaphragm unit 12 according to a second embodiment. FIG. 10A is the cross-sectional view taken along a line corresponding to A-A in FIG. 5. FIG. 10B is the cross-sectional view taken along a line corresponding to B-B in FIG. 5. FIG. 10C is the cross-sectional view taken along a line corresponding to C-C in FIG. 6. FIG. 10D is the cross-sectional view taken along a line corresponding to D-D in FIG. 6.

In the second embodiment, a rail part 21k is provided on a base plate 21 side and a protrusion 22k is provided on a driving ring 22 side. The rail part 21k is provided in an outer circumference direction of the base plate 21. In addition, a plurality of rail parts 21k may be provided as in the first embodiment. For example, a plurality of surfaces such as an open side plane part 21m, an inclined surface part 21n, and a small diaphragm side plane part 21p are provided.

The driving ring 22 has a pressing part 22r which extends from an outer circumference toward a back side of the base plate 21 and is rotatably fitted to the base plate 21. The pressing part 22r has the protrusion 22k which protrudes in the optical axial O direction and comes into contact with the rail part 21k in the base plate 21. The protrusion 22k comes into contact with the rail part 21k to be movable around the optical axial O.

A position of the driving ring 22 in the optical axial O direction is regulated when a protrusion part 21b provided on the base plate 21 comes into contact with a plane part 22c in the driving ring 22. At that time, a gap between the driving ring 22 and the base plate 21 in the optical axial O direction in which diaphragm blades 23 can move (blade space) is minimized. This point is the same as in the first embodiment.

The positional regulation on a side in which the blade space widens to have a maximum value is performed when the protrusion 22k protruding in the optical axial O direction of the pressing part 22r provided on the driving ring 22 comes into contact with the open side plane part 21m provided on the base plate 21.

The blade space changes when the rail part 21k and the protrusion 22k come into contact with each other. A plurality of surfaces included in the rail part 21k come into contact with the protrusion 22k at difference positions in the optical axial O direction. The plurality of surfaces are provided to correspond to a size of an aperture diameter D. A configuration is provided such that the protrusion 22k comes into contact with the open side plane part 21m at the time of opening, comes into contact with the small diaphragm side plane part 21p at the time of small diaphragm, and comes into contact with the inclined surface part 21n at the time of intermediate diaphragm. When the driving ring 22 is rotated, the protrusion 22k moves while coming into contact with the rail part 21k in a rotational direction of the driving ring 22. The driving ring 22 moves in the optical axial O direction without tilting and it is possible to change the blade space.

With the above configuration, as illustrated in FIGS. 10A to 10D, a blade space H1 at the time of opening is wider than a blade space H2 at the time of small diaphragm as in the first embodiment. In addition, as the aperture diameter D is increased, the blade space becomes wider.

In the first embodiment, the rail part is provided on the rotating ring side. However, many holes such as cam grooves are disposed and dimensional accuracy such as deformation at the time of molding is likely not to be stabilized. In the second embodiment, it is possible to realize more precise and stable blade driving by providing the rail part 21k on the base plate side having high rigidity.

Other Embodiments

Although the embodiments of the present invention have been described above, the present invention is not limited to the embodiments and various modifications are possible without departing from the gist of the present invention. For example, it is possible to realize a lens apparatus which can accomplish the action and effect of the diaphragm apparatus of the present invention by configuring a lens apparatus including the diaphragm apparatus according to the above-described embodiments.

It is possible to realize an imaging apparatus which can accomplish the action and effect of the diaphragm apparatus of the present invention by configuring the imaging apparatus which includes the lens apparatus including the diaphragm apparatus according to the above-described embodiments and a camera apparatus connected to the lens apparatus.

Also, although the aperture diameter D at the time of opening is assumed to be the first aperture diameter and the aperture diameter D at the time of small diaphragm is assumed to be the second aperture diameter in the above-described embodiments, this assumption is merely an example. In other words, in the above-described embodiments, the first aperture diameter is not limited to the aperture diameter at the time of opening (maximum aperture diameter) and the second aperture diameter is not limited to the aperture diameter at the time of small diaphragm (minimum aperture diameter). In the above-described embodiments, the blade space H1 at the time of the first aperture diameter may be wider than the blade space H2 at the time of the second aperture diameter smaller than the first aperture diameter.

Although the above-described lens apparatus 100 includes a lens group of three groups, this is merely an example. The lens apparatus 100 may include a lens unit which leads light from an object to the diaphragm apparatus.

Figure 11:
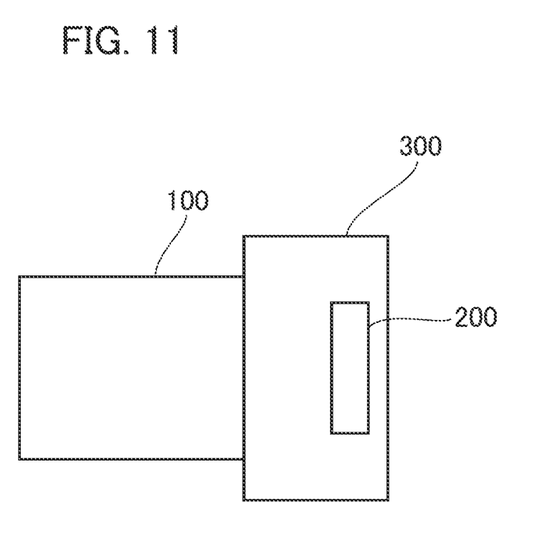
FIG. 11 is a diagram showing a configuration of an imaging apparatus according to an embodiment of the present invention.

As illustrated in FIG. 11, the lens apparatus 100 including the diaphragm apparatus illustrated in the above-described embodiments can be attached to a camera main body 300 which holds an imaging element 200 configured to receive light from the lens apparatus 100. The lens apparatus 100 and the camera main body 300 illustrated in FIG. 11 are collectively set to an imaging apparatus. The lens apparatus 100 may or may not be attachable to and detachable from the camera main body 300.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-218602 filed on Nov. 13, 2017, which are hereby incorporated by reference herein in its entirety.

What is claimed is:

1. A diaphragm apparatus comprising:
   a plurality of diaphragm blades that define an aperture diameter;
   a driving member, which includes a protrusion protruding in an optical axis direction, configured to rotate around an optical axis and drive the diaphragm blades to change the aperture diameter; and
   a base plate including a rail part configured to contact the protrusion, which is moveable in a direction of a rotation of the driving member,
   wherein the plurality of diaphragm blades are disposed in a gap between the driving member and the base plate, the gap being defined when the protrusion and the rail part are in contact with each other,
   wherein a size of the gap changes in accordance with the rotation of the driving member in the optical axis direction, and
   wherein the size of the gap in the optical axis direction when the aperture diameter is at a maximum aperture diameter is greater than the size of the gap in the optical axis direction when the aperture diameter is at a minimum aperture diameter.

2. The diaphragm apparatus according to claim 1, wherein the protrusion contacts with the rail part at different positions in the optical axis direction along with the rotation of the driving member.

3. The diaphragm apparatus according to claim 1, wherein a surface of the rail part contacting with the protrusion is provided to correspond to a size of the aperture diameter.

4. The diaphragm apparatus according to claim 1, wherein:
   the base plate has a protrusion part which protrudes in the optical axis direction, and
   the size of the gap is minimized in the optical axis direction when the protrusion part and the driving member contact with each other.

5. The diaphragm apparatus according to claim 1, wherein a plurality of rail parts are provided in an outer circumference direction of the base plate.

6. The diaphragm apparatus according to claim 1, wherein the size of the gap in the optical axis direction increases as the aperture diameter increases.

7. An imaging apparatus comprising:
   the diaphragm apparatus according to claim 1; and
   an imaging element that receives light from the diaphragm apparatus.

8. A lens apparatus comprising:
   a diaphragm apparatus; and
   a lens unit that guides light from an object to the diaphragm apparatus,
   wherein the diaphragm apparatus comprises:
   a plurality of diaphragm blades that define an aperture diameter;
   a driving member, which includes a protrusion protruding in an optical axis direction, configured to rotate around an optical axis and drive the diaphragm blades to change the aperture diameter; and a base plate including a rail part configured to contact the protrusion, which is moveable in a direction of a rotation of the driving member, wherein the plurality of diaphragm blades are disposed in a gap between the driving member and the base plate, the gap being defined when the protrusion and the rail part are in contact with each other, wherein a size of the gap changes in accordance with the rotation of the driving member in the optical axis direction, and wherein the size of the gap in the optical axis direction when the aperture diameter is at a maximum aperture diameter is greater than the size of the gap in the optical axis direction when the aperture diameter is at a minimum aperture diameter.

9. A diaphragm apparatus comprising:

a plurality of diaphragm blades that define an aperture diameter;

a driving member, which includes a protrusion protruding in an optical axis direction, configured to rotate around an optical axis and drive the diaphragm blades to change the aperture diameter; and a base plate including a rail part configured to contact the protrusion, which is moveable in a direction of a rotation of the driving member, wherein the plurality of diaphragm blades are disposed in a gap between the driving member and the base plate, the gap being defined when the protrusion and the rail part are in contact with each other, wherein a size of the gap changes in accordance with the rotation of the driving member in the optical axis direction, wherein the size of the gap in the optical axis direction when the aperture diameter is a first aperture diameter is greater than the size of the gap in the optical axis direction when the aperture diameter is a second aperture diameter smaller than the first aperture diameter, wherein the base plate has a protrusion part that protrudes in the optical axis direction, and wherein the size of the gap is minimized in the optical axis direction when the protrusion part and the driving member contact with each other.

* * * * *